(12) United States Patent
Hori et al.

(10) Patent No.: US 6,925,798 B2
(45) Date of Patent: Aug. 9, 2005

(54) INTERNAL COMBUSTION ENGINE WITH TORQUE CONVERTER

(75) Inventors: Yoshiaki Hori, Saitama (JP); Hideyuki Tawara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/401,784

(22) Filed: Mar. 31, 2003

(65) Prior Publication Data

US 2003/0209012 A1 Nov. 13, 2003

(30) Foreign Application Priority Data

May 8, 2002 (JP) ........................................ 2002-132566

(51) Int. Cl.[7] ............................................. F16D 33/00
(52) U.S. Cl. ........................................... 60/336; 60/362
(58) Field of Search ........................... 60/330, 336, 352, 60/362, 366, 372

(56) References Cited

U.S. PATENT DOCUMENTS 4,970,860 A * 11/1990 Mezger et al. ............... 60/337
6,382,379 B2 * 5/2002 Yoshimoto et al. ......... 192/3.25
6,460,331 B2 * 10/2002 Sakuma et al. ............... 60/362

FOREIGN PATENT DOCUMENTS

JP             1-180054 U      12/1989

* cited by examiner

Primary Examiner—Edward K. Look
Assistant Examiner—Devin Hanan
(74) Attorney, Agent, or Firm—Birch, Stewart, Kolasch & Birch, LLP

(57) ABSTRACT

A structure has individual oil passages for different applications of oil. A torque converter is provided on a crankshaft having an axially extending center hole. A crank chamber and a transmission chamber are separated from each other through a one-way valve. A pipe is inserted in the center hole of the crankshaft to form an oil passage for supplying hydraulic oil for driving the torque converter, an oil passage returned from the torque converter, and an oil passage for supplying a lubricating oil to the area surrounding the crankshaft. The oil passage returned from the torque converter is in communication with a chamber defined by a pair of inner and outer oil seals for sealing a bearing mounted on the crankshaft, a lower portion of the transmission chamber, and an oil passage having a check valve at the downstream end thereof.

17 Claims, 10 Drawing Sheets

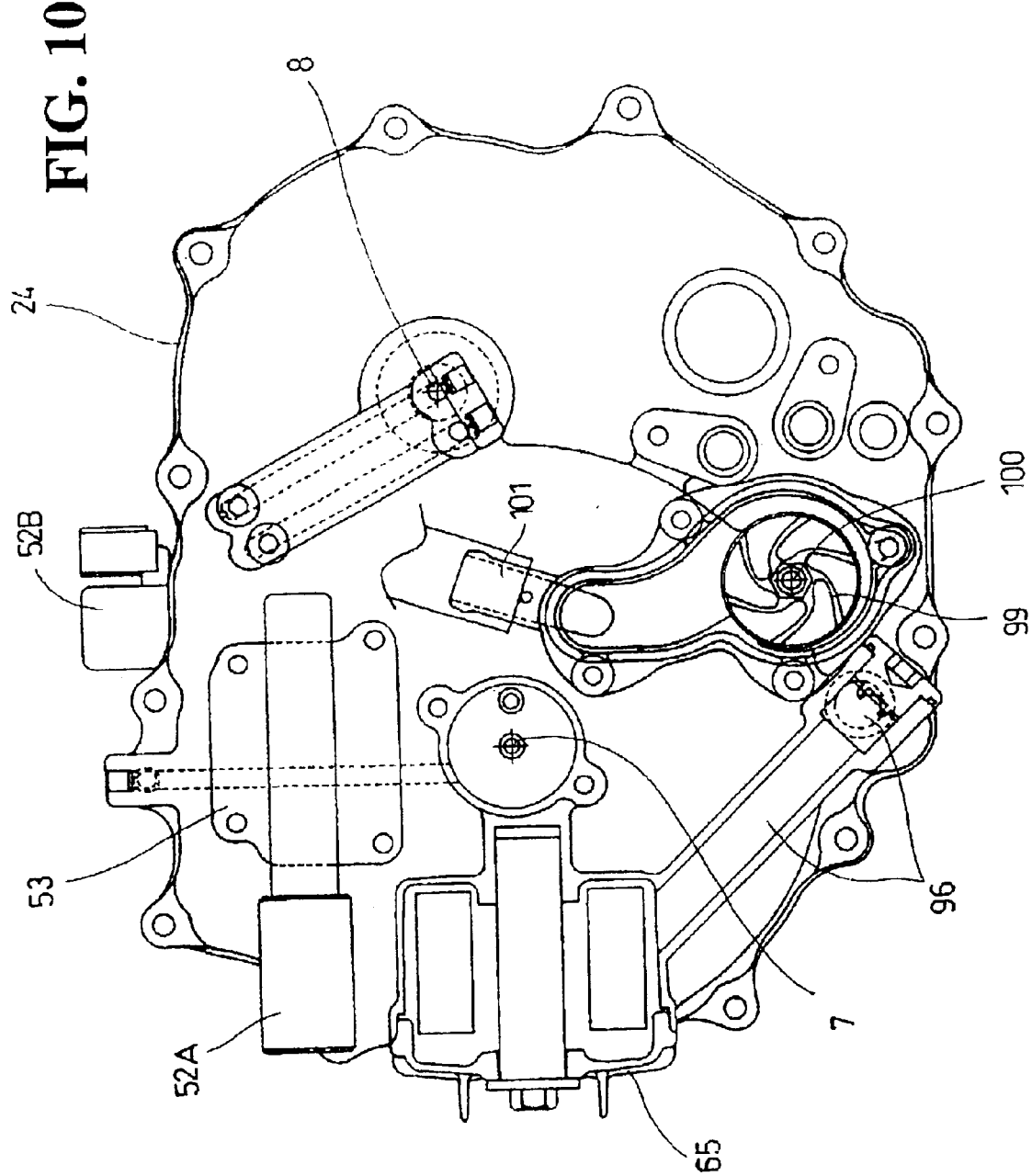

INTERNAL COMBUSTION ENGINE WITH TORQUE CONVERTER

CROSS-REFERENCE TO RELATED APPLICATION

The present application claims priority under 35 U.S.C. §119 to Japanese Patent Application No. 2002-132566, filed May 8, 2002, the entire contents of which are hereby incorporated by reference.

BACKGROUND OF THE INVENTION

1. Field of the Invention

The present invention relates to an internal combustion engine with a torque converter mounted on a four-wheel buggy (saddle type vehicle for rough terrain running) or the like.

2. Description of Related Art

A related art device is described in Japanese Utility Model Laid-open No. Hei 1-180054. In this related art device, a crank chamber, a torque converter chamber, and a transmission chamber are separated from each other. Hydraulic oil is supplied to the torque converter by an oil pump driven from a transmission shaft.

In the related art, the crank chamber, the torque converter chamber, and the transmission chamber are separated by walls. Accordingly, if an oil passage dedicated to the torque converter for supplying the hydraulic oil to the torque converter is provided, a sealing structure is complicated. If lubricating oil for an internal combustion engine is also used as the hydraulic oil for the torque converter, the return oil from the torque converter is returned directly to the atmosphere in the crankcase rather than to an oil reservoir. This causes the production of oil mist in the crankcase, reducing breather function. However, if an oil passage extending through the wall between the crank chamber and the torque converter chamber is formed as a return oil passage from the torque converter independently of the lubrication for the internal combustion engine, the whole structure is undesirably complicated.

SUMMARY OF THE INVENTION

It is accordingly an object of the present invention to provide a smart structure having individual oil passages for different applications of oil.

According to first aspect of the present invention, an internal combustion engine includes a torque converter provided on a crankshaft having an axially extending center hole for supplying hydraulic oil to said torque converter, wherein a return oil passage from said torque converter is in communication with a hydraulic oil return passage formed in said crankshaft so as to extend axially of said crankshaft, a chamber is defined by a pair of inner and outer oil seals for sealing a bearing mounted on said crankshaft, and an oil passage is in communication with a crankcase and has a check valve at a downstream end thereof.

The oil passage leading to the torque converter and the oil passage returned from the torque converter are configured as described above, so that the return oil from the torque converter can be returned to an oil reservoir with a simple structure without a reduction in breather function due to the oil return into the air.

According to a second aspect of the present invention, a pipe is inserted in said center hole of said crankshaft to form a hydraulic oil passage leading to said torque converter, said return oil passage from said torque converter, and a lubricating oil passage leading to an area surrounding said crankshaft; and a crank chamber and a transmission chamber are separated from each other through a one-way valve.

With this configuration, the crank chamber can be closed and the amount of oil supplied into the crank chamber can be limited to a minimum amount required by area surrounding the crankshaft, thereby reducing an influence of friction due to agitation. Furthermore, the oil supply passage dedicated to the torque converter is ensured to allow a reduction in amount of oil to be supplied to the whole of the crank system. Accordingly, the crankcase can be reduced in volume to reduce the weight of the power unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a front elevation of the oil filter and its associated parts provided on the front side of the front crankcase cover.

DETAILED DESCRIPTION OF THE PREFERRED EMBODIMENTS

Figure 1:
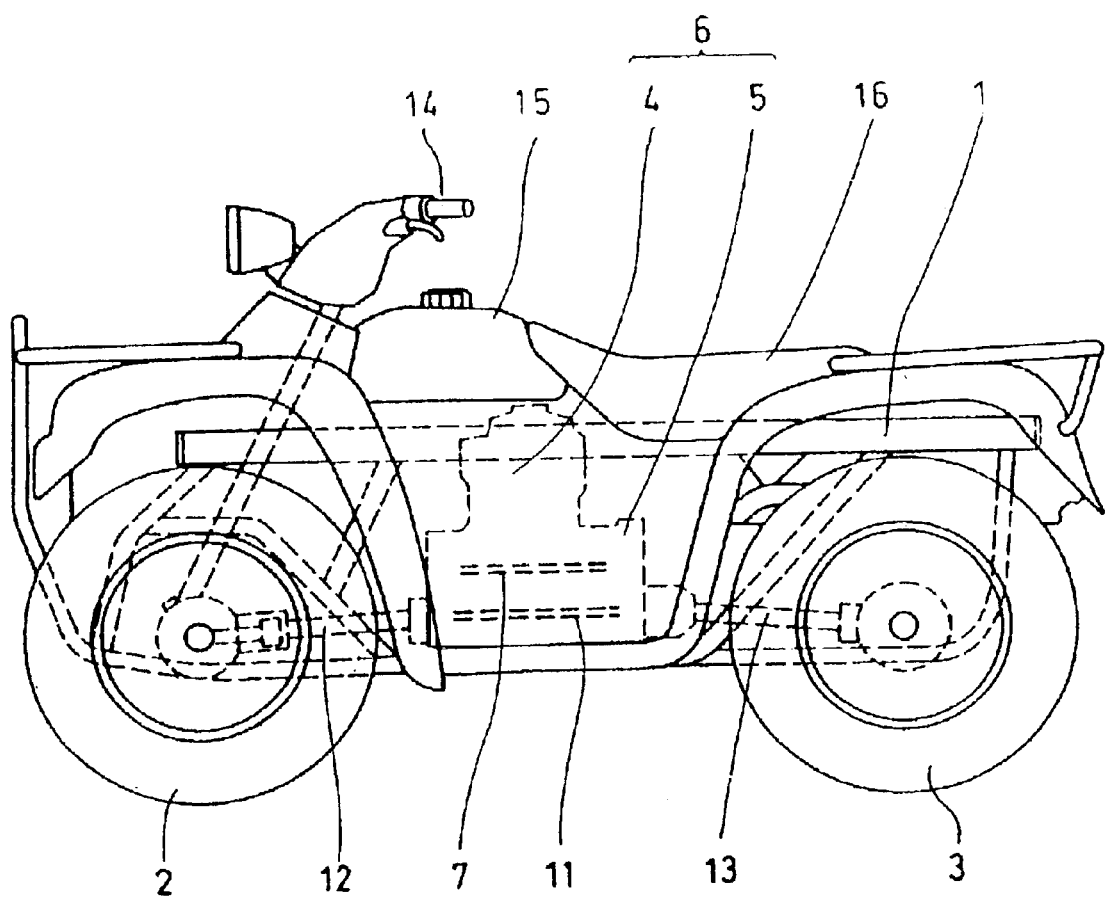
FIG. 1 is a side view of a four-wheel buggy (saddle type vehicle for rough terrain running) having a power unit with an automatic transmission according to a preferred embodiment of the present invention.

The present invention will now be described with reference to the accompanying drawings, wherein the same or similar elements have been identified by the same reference numerals.

FIG. 1 is a side view of a four-wheel buggy (saddle type vehicle for rough terrain running) having a power unit with an automatic transmission according to a preferred embodiment of the present invention. The buggy includes a body frame 1, a pair of right and left front wheels 2 provided at a front portion of the body frame 1, and a pair of right and left rear wheels 3 provided at a rear portion of the body frame 1. A power unit 6 configured by integrating an internal combustion engine 4 and a transmission 5 is supported at a central portion of the body frame 1. The power unit 6 is arranged so that a crankshaft 7 extends in the longitudinal direction of the vehicle.

As will be hereinafter described in detail, the rotation of the crankshaft 7 is transmitted through a main shaft 8, an intermediate shaft 9, and a counter shaft 10 to an output shaft 11 in the transmission 5. The shafts 8, 9, 10, and 11 extend parallel to the crankshaft 7 in the longitudinal direction of the vehicle. The front wheels 2 are driven by a front drive shaft 12 connected to the front end of the output shaft 11, and the rear wheels 3 are driven by a rear drive shaft 13 connected to the rear end of the output shaft 11. A steering handle or handlebars 14, a fuel tank 15, and a saddle seat 16 are arranged in this order from the front side of the vehicle on an upper portion of the body frame 1.

Figure 2:
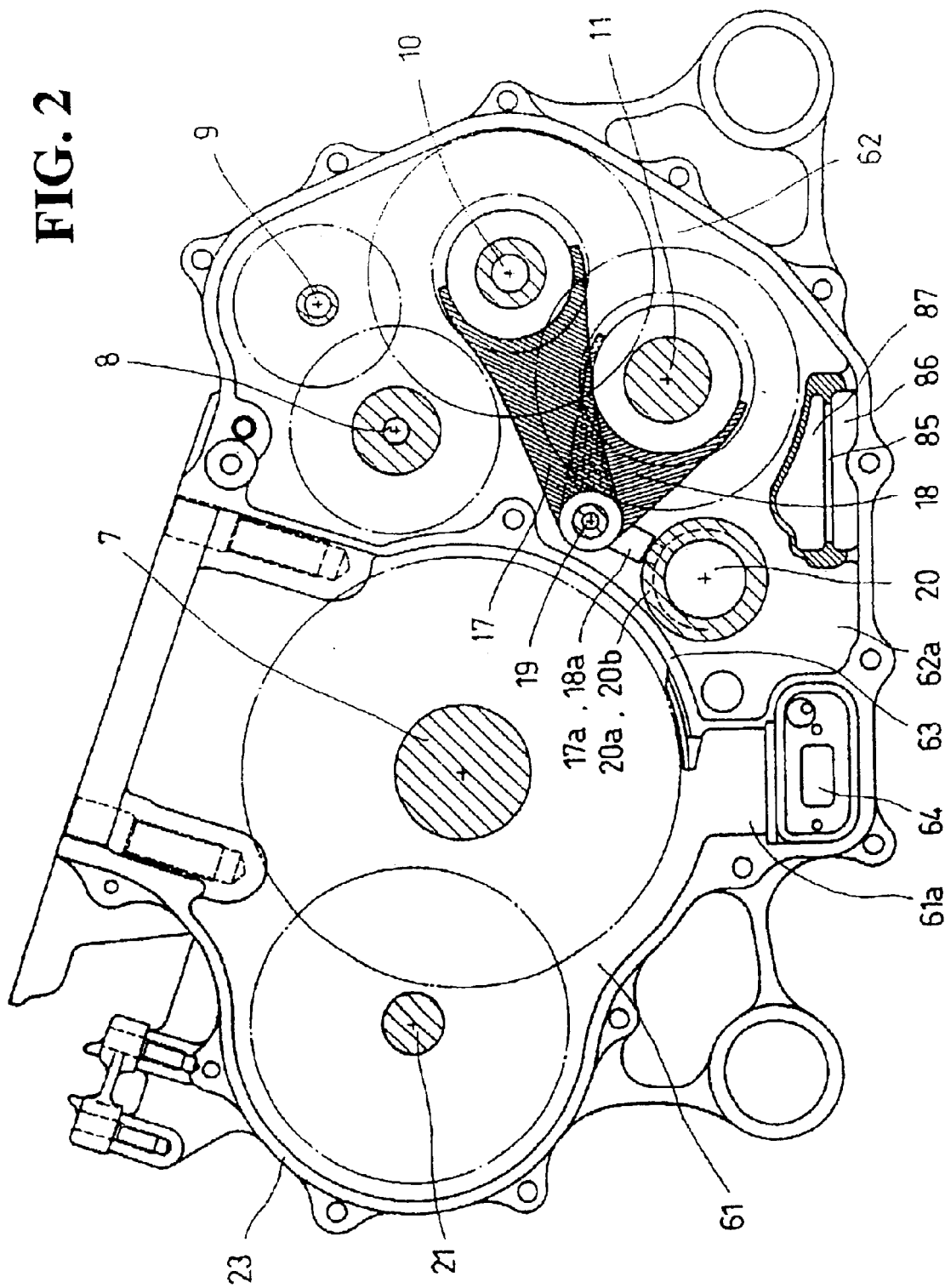
FIG. 2 is a front elevation in cross section of the crankcase of the power unit.
Figure 3:
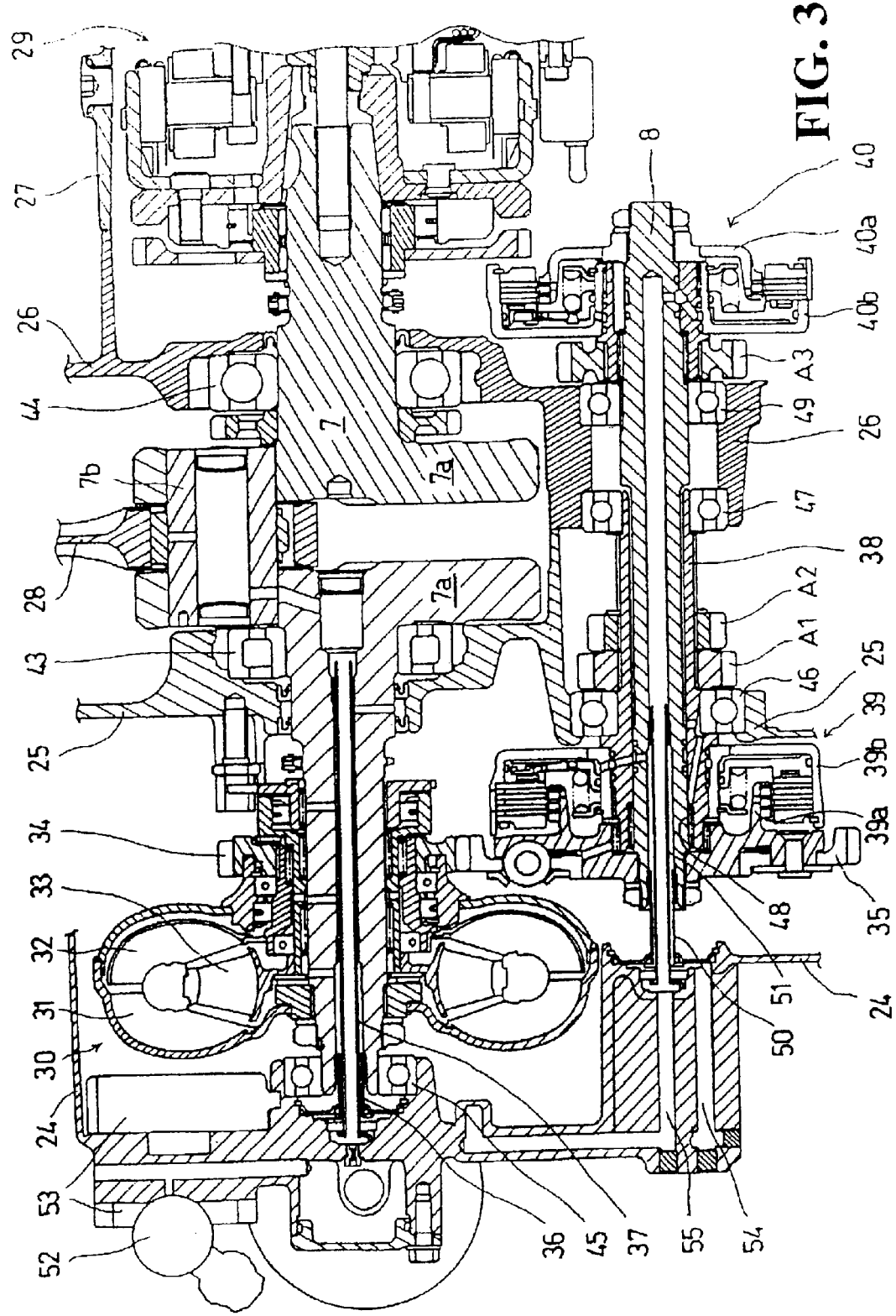
FIG. 3 is a longitudinal sectional view including the crankshaft and the main shaft.
Figure 4:
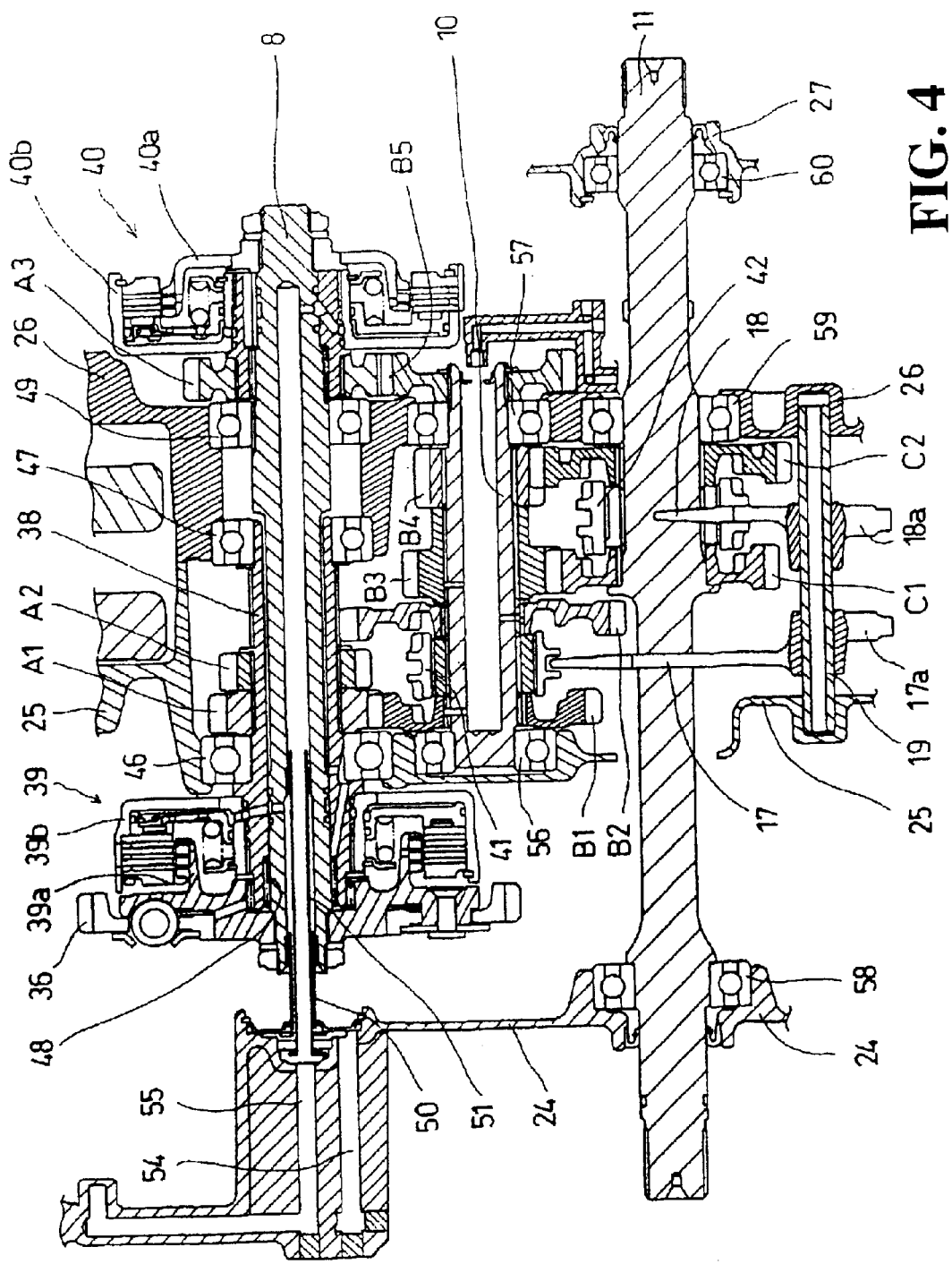
FIG. 4 is a longitudinal sectional view in development including the main shaft, the counter shaft, the output shaft, and the shift fork guide shaft.
Figure 5:
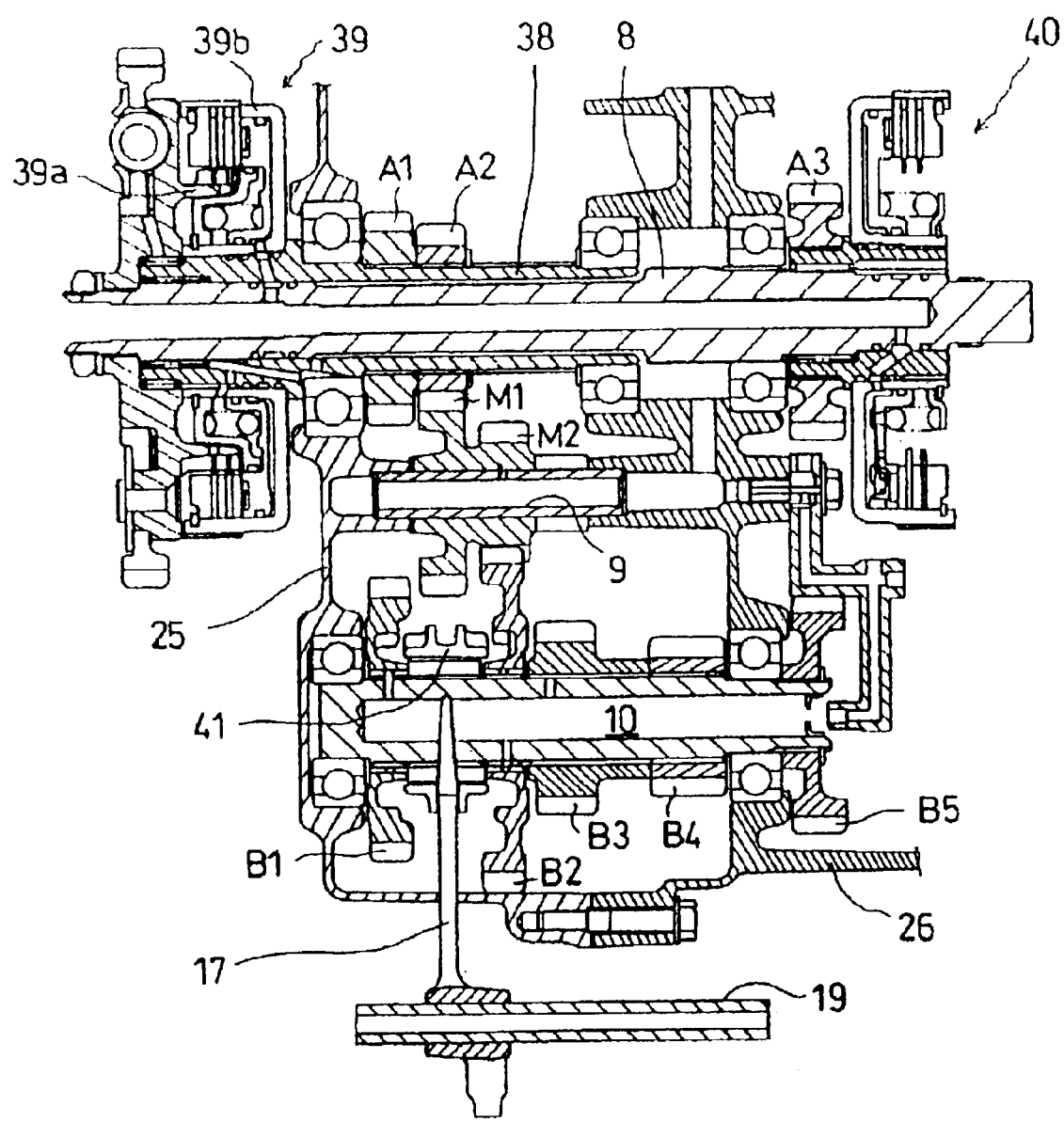
FIG. 5 is a longitudinal sectional view in development including the main shaft, the intermediate shaft, the counter shaft, and the shift fork guide shaft.

FIG. 2 is a front elevation in cross section of a crankcase 23 of the power unit 6, showing the crankshaft 7, the main shaft 8, the intermediate shaft 9, the counter shaft 10, and the output shaft 11. FIG. 2 further shows the positions of shift forks 17 and 18, a shift fork guide shaft 19, and a shift drum 20. A balance weight shaft 21 is provided in the vicinity of the crankshaft 7. FIG. 3 is a longitudinal sectional view including the crankshaft 7 and the main shaft 8. FIG. 4 is a longitudinal sectional view in development including the main shaft 8, the counter shaft 10, the output shaft 11, and the shift fork guide shaft 19. FIG. 5 is a longitudinal sectional view in development including the main shaft 8, the intermediate shaft 9, the counter shaft 10, and the shift fork guide shaft 19. These sectional views show a power transmitting mechanism, and in particular FIGS. 4 and 5 show a portion related to the automatic transmission.

FIG. 3 shows a power transmitting mechanism related to the crankshaft 7 and the main shaft 8. The crankcase 23 of the power unit 6 is composed of a front crankcase cover 24, a front crankcase 25, a rear crankcase 26, and a rear crankcase cover 27 arranged in this order from the front side of the power unit 6. The crankshaft 7 is rotatably supported through bearings 43 and 44, respectively, to the front and rear crankcases 25 and 26. An extended front end of the crankshaft 7 is supported through a bearing 45 to the front crankcase cover 24. The crankshaft 7 is divided into front and rear sections in the longitudinal direction. The front and rear sections of the crankshaft 7 are connected at their crank webs 7a by a crankpin 7b. A connecting rod 28 is supported by the crankpin 7b. An alternator 29 for producing alternating current by the rotation of the crankshaft 7 is mounted on a rear end portion of the crankshaft 7 (the rear section).

A torque converter 30 is mounted on a front portion of the crankshaft 7 (the front section). A primary drive gear 34 adjacent to the torque converter 30 is loosely engaged with the crankshaft 7. The torque converter 30 includes a pump impeller 31 fixed to the crankshaft 7, a turbine runner 32 opposed to the pump impeller 31, and a stator 33. The turbine runner 32 is connected to the primary drive gear 34. Hydraulic oil is supplied to the torque converter 30 from between an outer pipe 36 and an inner pipe 37 constituting a double pipe inserted in a center hole of the crankshaft 7 from the front crankcase cover 24. Lubricating oil is supplied to the crankpin 7b through the inner pipe 37. The double pipe is elastically supported through an o-ring to the front crankcase cover 24, thereby absorbing eccentricity of the double pipe.

A tubular auxiliary main shaft 38 is provided on the outer circumference of the main shaft 8 at its front half portion. The auxiliary main shaft 38 is rotatably supported through bearings 46 and 47, respectively, to the front and rear crankcases 25 and 26. The front half portion of the main shaft 8 is inserted through a center hole of the auxiliary main shaft 38 and is rotatably supported through a needle bearing 48 to the auxiliary main shaft 38. The main shaft 8 is further rotatably supported at its rear portion through a bearing 49 to the rear crankcase 26. Thus, the main shaft 8 and the auxiliary main shaft 38 are rotatable relatively to each other.

A primary driven gear 35 normally meshing with the primary drive gear 34 is fixed to a front end portion of the main shaft 8. The rotation of the crankshaft 7 is transmitted through the torque converter 30 to the primary drive gear 34 and then to the primary driven gear 35 meshing with the primary drive gear 34. Accordingly, the rotation of the crankshaft 7 is transmitted to the main shaft 8 with a primary speed reduction being obtained by the gears 34 and 35. The main shaft 8 is normally rotated during operation of the internal combustion engine 4.

A first-speed hydraulic multiplate clutch 39 is provided at a front end portion of the auxiliary main shaft 38 on the front side of the bearing 46. A first-speed drive gear A1 and a reverse drive gear A2 are fixed to the auxiliary main shaft 38 on the rear side of the bearing 46. The first-speed hydraulic multiplate clutch 39 has an inner member 39a integral with the primary driven gear 35 fixed to the main shaft 8 and an outer member 39b fixed to the auxiliary main shaft 38. When the first-speed hydraulic multiplate clutch 39 is engaged by hydraulic pressure, the main shaft 8 and the auxiliary main shaft 38 are connected together through the primary driven gear 35 and the clutch 39, thereby transmitting the rotation of the main shaft 8 to the first-speed drive gear A1 and the reverse drive gear A2 fixed to the auxiliary main shaft 38.

A second-speed drive gear A3 larger in diameter than the first-speed drive gear A1 is loosely engaged with a rear end portion of the main shaft 8 on the rear side of the bearing 49. A second-speed hydraulic multiplate clutch 40 is provided axially adjacent to the second-speed drive gear A3. The second-speed hydraulic multiplate clutch 40 has an inner member 40a fixed to the main shaft 8 and an outer member 40b connected to the second-speed drive gear A3 so as to be rotatable therewith. When the second-speed hydraulic multiplate clutch 40 is engaged by hydraulic pressure, the rotation of the main shaft 8 is transmitted to the second-speed drive gear A3.

In engaging the first-speed clutch 39 or the second-speed clutch 40, hydraulic oil is supplied to either the clutch 39 or the clutch 40. The hydraulic oil is supplied to the clutch 39 from between an outer pipe 50 and an inner pipe 51 constituting a double pipe inserted from the front crankcase cover 24 into the center hole of the main shaft 8. On the other hand, the hydraulic oil is supplied to the clutch 40 through the inner pipe 51 of the double pipe. The supply of the hydraulic oil to the clutch 39 or 40 is switched by controlling the energization of a solenoid valve 52 to switch between oil passages formed in a valve body 53. Accordingly, the supply of the hydraulic oil is switch between oil passages 54 and 55 formed in the front crankcase cover 24. The oil passages 54 and 55 are in communication with the above mentioned double pipe. The energization of the solenoid valve 52 is automatically performed by a command signal from an electronic control unit according to parameters such as vehicle speed and throttle opening. The above mentioned double pipe is elastically supported through an o-ring to the front crankcase cover 24, thereby absorbing eccentricity of the double pipe.

FIG. 4 shows a power transmitting mechanism for power transmission from the main shaft 8 through the counter shaft 10 to the output shaft 11. The counter shaft 10 is rotatably supported through bearings 56 and 57, respectively, to the front and rear crankcases 25 and 26. The output shaft 11 is rotatably supported through bearings 58, 59, and 60, respectively, to the front crankcase cover 24, the rear crankcase 26, and the rear crankcase cover 27.

A first-speed driven gear B1 and a reverse driven gear B2 are loosely engaged with the counter shaft 10. A dog clutch 41 for selecting a forward position or a reverse position is provided between the first-speed driven gear B1 and the reverse driven gear B2. By moving the shift fork 17 to operate the dog clutch 41, either the gear B1 or B2 can be selectively fixed to the counter shaft 10. Furthermore, a high drive gear B3, a low drive gear B4, and a second-speed driven gear B5 are fixed to the counter shaft 10. The high drive gear B3 is larger in diameter than the low drive gear B4.

A high driven gear C1 and a low driven gear C2 are loosely engaged with the output shaft 11. A dog clutch 42 for selecting a high position or a low position is provided between the high driven gear C1 and the low driven gear C2. By moving the shift fork 18 to operate the dog clutch 42, either the gear C1 or C2 can be selectively fixed to the output shaft 11. The shift forks 17 and 18 are supported to the guide shaft 19. The shift forks 17 and 18 are provided with shifter pins 17a and 18a, respectively. The outer ends of the shifter pins 17a and 18a are inserted in cam grooves 20a and 20b formed on the shift drum 20 shown in FIG. 2, respectively. The cam grooves 20a and 20b are formed as grooves dedicated to the shifter pins 17a and 18a, respectively. By rotating the shift drum 20, the shift forks 17 and 18 are moved through the shifter pins 17a and 18a and the cam grooves 20a and 20b. The rotation of the shift drum 20 is manually made by an operator through an operation cable (not shown) connected to a shift lever (not shown) provided on the steering handle 14.

The first-speed driven gear B1 loosely engaged with the counter shaft 10 is normally in mesh with the first-speed drive gear A1 fixed to the auxiliary main shaft 38. The reverse driven gear B2 loosely engaged with the counter shaft 10 is normally in mesh with the reverse drive gear A2 fixed to the auxiliary main shaft 38 through direction changing gears M1 and M2 to be hereinafter described. The high drive gear B3 and the low drive gear B4 each fixed to the counter shaft 10 are normally in mesh with the high driven gear C1 and the low driven gear C2 each loosely engaged with the output shaft 11, respectively. The second-speed driven gear B5 fixed to the counter shaft 10 is normally in mesh with the second-speed drive gear A3 loosely engaged with the main shaft 8.

FIG. 5 shows a power transmitting mechanism for power transmission from the main shaft 8 through the intermediate shaft 9 to the counter shaft 10. The intermediate shaft 9 is supported to the front and rear crankcases 25 and 26. The direction changing gears M1 and M2 are rotatably supported on the intermediate shaft 9. The direction changing gears M1 and M2 are idle gears having a common boss portion. The gear M2 is smaller in diameter than the gear M1. The gear M1 is normally in mesh with the reverse drive gear A2 fixed to the auxiliary main shaft 38, and the gear M2 is normally in mesh with the reverse driven gear B2 loosely engaged with the counter shaft 10.

In the following description of the operation of the above-mentioned power transmitting mechanism, the related terms will be simplified for the convenience of illustration as follows:

Selection of the first-speed hydraulic multiplate clutch 39: "first speed;"

Selection of the second-speed hydraulic multiplate clutch 40: "second speed;"

Selection of the first-speed driven gear B1 by the forward/reverse selecting dog clutch 41: "forward;"

Selection of the reverse driven gear B2 by the forward/reverse selecting dog clutch 41: "reverse;"

Selection of the high driven gear C1 by the high/low selecting dog clutch 42: "high gear;" and Selection of the low driven gear C2 by the high/low selecting dog clutch 42: "low gear."

The number of selective combinations of the hydraulic clutches 39 and 40 and the dog clutches 41 and 42 is six. These selective combinations are specifically shown below in increasing order of vehicle speed. In each selective combination, a working gear train is also shown.

(1). In the case of forward running:
  (a). first speed, forward, low gear: A1-B1-B4-C2;
  (b). first speed, forward, high gear: A1-B1-B3-C1;
  (c). second speed, low gear: A3-B5-B4-C2; and
  (d). second speed, high gear: A3-B5-B3-C1;
(2). In the case of reverse running:
  (a). first speed, reverse, low gear: A2-M1-M2-B2-B4-C2; and
  (b). first speed, reverse, high gear: A2-M1-M2-B2-B3-C1

Referring to FIG. 2, a crank chamber 61 and a transmission chamber 62 are separated from each other by a partition wall 63. The crank chamber 61 is closed by the partition wall 63 and is in communication with the transmission chamber 62 at a lower portion of the partition wall 63. This communicating portion between the crank chamber 61 and the transmission chamber 62 is provided with a one-way valve 64. When a piston in the engine 4 is lowered to increase the pressure in the crank chamber 61, the oil in the crank chamber 61 is urged by this increased pressure to flow out through the one-way valve 64 to the transmission chamber 62.

Figure 6:
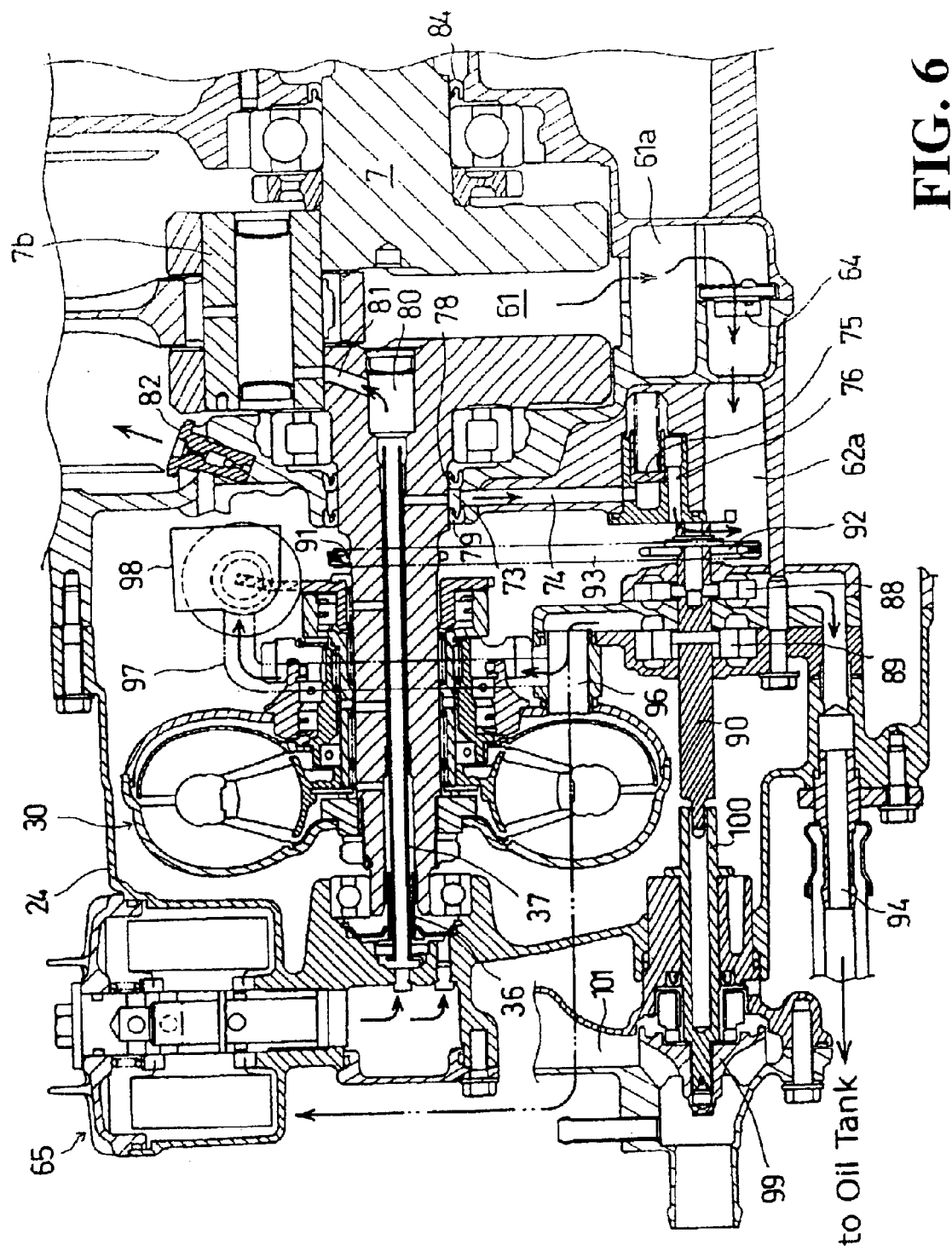
FIG. 6 is a longitudinal sectional view of the power unit, including the crankshaft and the one-way valve.
Figure 7:
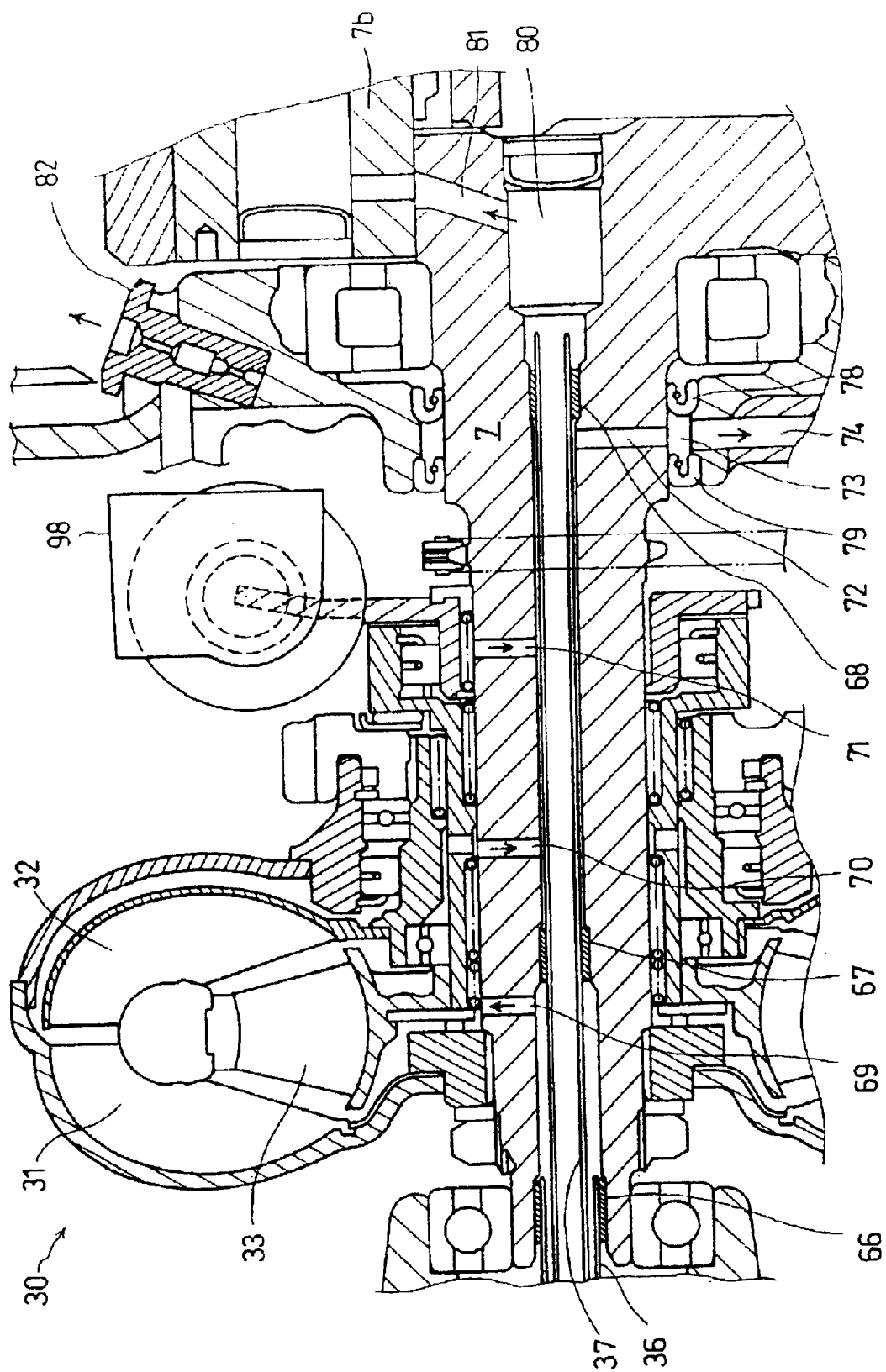
FIG. 7 is an enlarged view of a part shown in FIG. 6.

FIG. 6 is a longitudinal sectional view of the power unit, including the crankshaft 7 and the one-way valve 64. FIG. 7 is an enlarged view of a part shown in FIG. 6, showing a front half portion of the crankshaft 7 and its periphery. In FIGS. 6 and 7, the arrows indicate a direction of oil flow. An oil filter 65 is mounted on the front side of the front crankcase cover 24. The hydraulic oil flowing through the oil filter 65 and the front crankcase cover 24 to the torque converter 30 provided at the front portion of the crankshaft 7 is supplied from between the outer pipe 36 and the inner pipe 37 constituting the double pipe inserted in the center hole 80 of the crankshaft 7 from the front crankcase cover 24. As shown in FIG. 7, the hydraulic oil is further supplied from a space defined by the inner pipe 37, the crankshaft 7, and seals 66 and 67 through a radial oil passage 69 formed in the crankshaft 7 to the torque converter 30.

Figure 9:
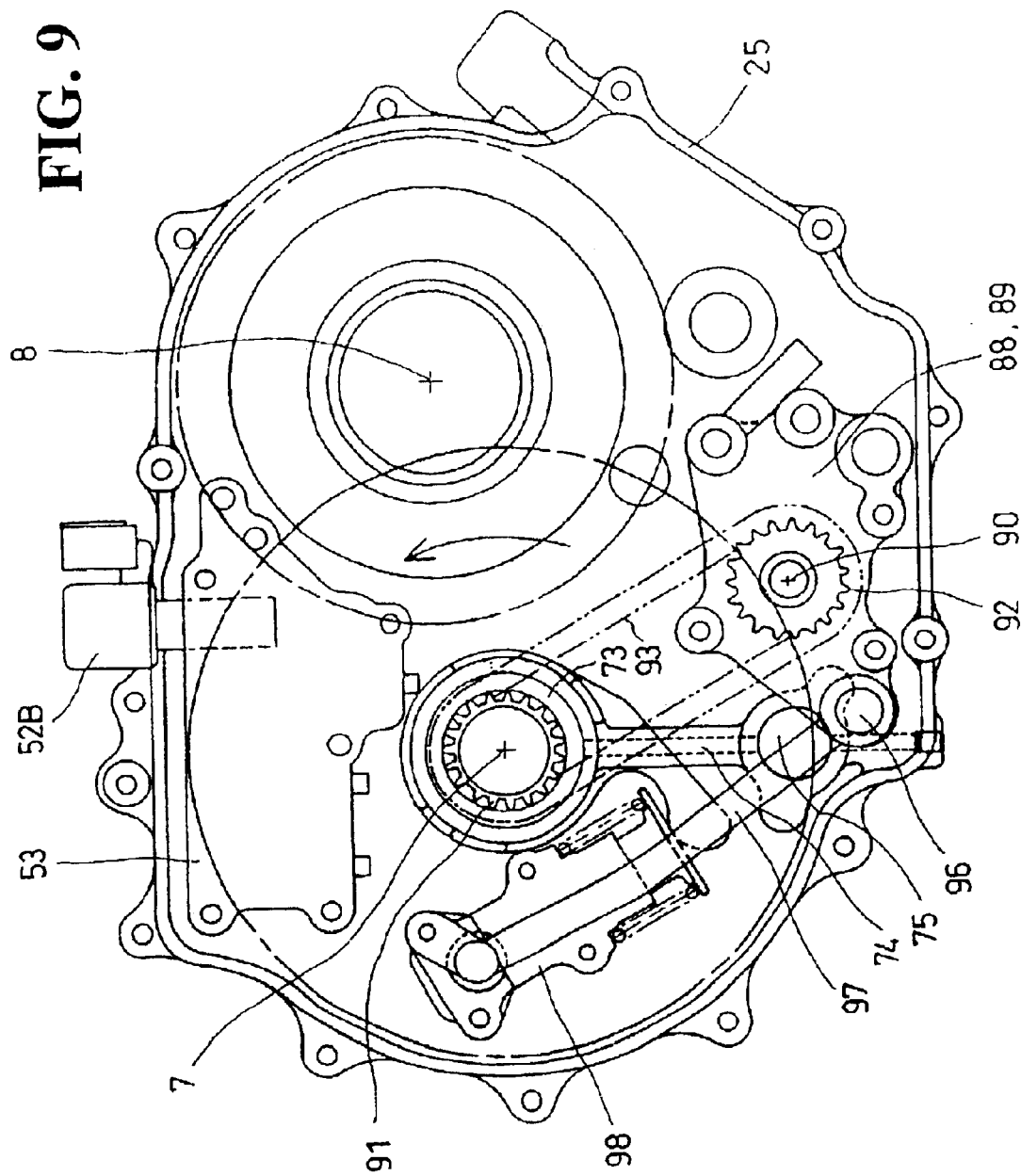
FIG. 9 is a front elevation of the oil pump and its associated parts provided between the front crankcase cover and the front crankcase.

The oil discharged from the torque converter 30 lubricates a bearing portion, and thereafter flows through radial oil passages 70 and 71 formed in the crankshaft 7 to a space defined by the inner pipe 37, the crankshaft 7, and seals 67 and 68. The oil further flows through a radial oil passage 72 formed in the crankshaft 7, an annular small chamber 73 defined between the crankshaft 7 and the front crankcase 25, and an oil passage 74 formed in the front crankcase 25 to a check valve 75 shown in FIG. 6. The oil further flows through the check valve 75 and a discharge oil passage 76 to a lower space 62a of the transmission chamber 62. The annular small chamber 73 defined between the crankshaft 7 and the front crankcase 25 is closed at its axially opposite ends by an oil seal 78 for sealing the bearing 43 and an oil seal 79 on the front side of the oil seal 78, thereby preventing oil leakage from the axially opposite ends of the annular small space 73. The positions of the annular small space 73, the oil passage 74, and the check valve 75 as viewed from the front side of the power unit 6 are shown in FIG. 9, and will be described later.

The pressure of the hydraulic oil in the torque converter 30 must be maintained at a given value or more in order to properly operate the torque converter 30. The reason for providing the check valve 75 at the end of the above-mentioned hydraulic oil discharge path is to maintain the pressure upstream of the check valve 75, i.e., the pressure of the hydraulic oil in the torque converter 30 at a given value or more. The check valve 75 serves also to prevent the oil from being discharged from the torque converter 30 when the internal combustion engine 4 is left for a long period of time.

The lubricating oil is supplied to the crankpin 7b through the inner pipe 37 inserted in the center hole 80 of the crankshaft 7 from the front crankcase cover 24, an oil passage formed at a rear end portion of the center hole 80, and a radial oblique oil passage 81 formed in the crankshaft 7. Lubrication of the inside of the cylinder and a lower portion of the piston is made by an oil jet sprayed from an oil spraying device 82 (an oil passage to the oil spraying device 82 not being shown).

After the oil supplied through the radial oblique oil passage 81 and through the oil spraying device 82 lubricates the required portions, the oil drops into a lower space 61a of the crank chamber 61 shown in FIGS. 2 and 6. As mentioned above, the crank chamber 61 is a closed chamber, and the gaps between the crankcase 23 and the crankshaft 7 near the bearings 43 and 44 are sealed by the front oil seal 78 and a rear oil seal 84. Accordingly, when the piston is lowered to increase the pressure in the crank chamber 61, the oil in the lower space 61a of the crank chamber 61 is expelled through the one-way valve 64 into the lower space 62a of the transmission chamber 62 to join with the oil passed through the check valve 75.

Figure 8:
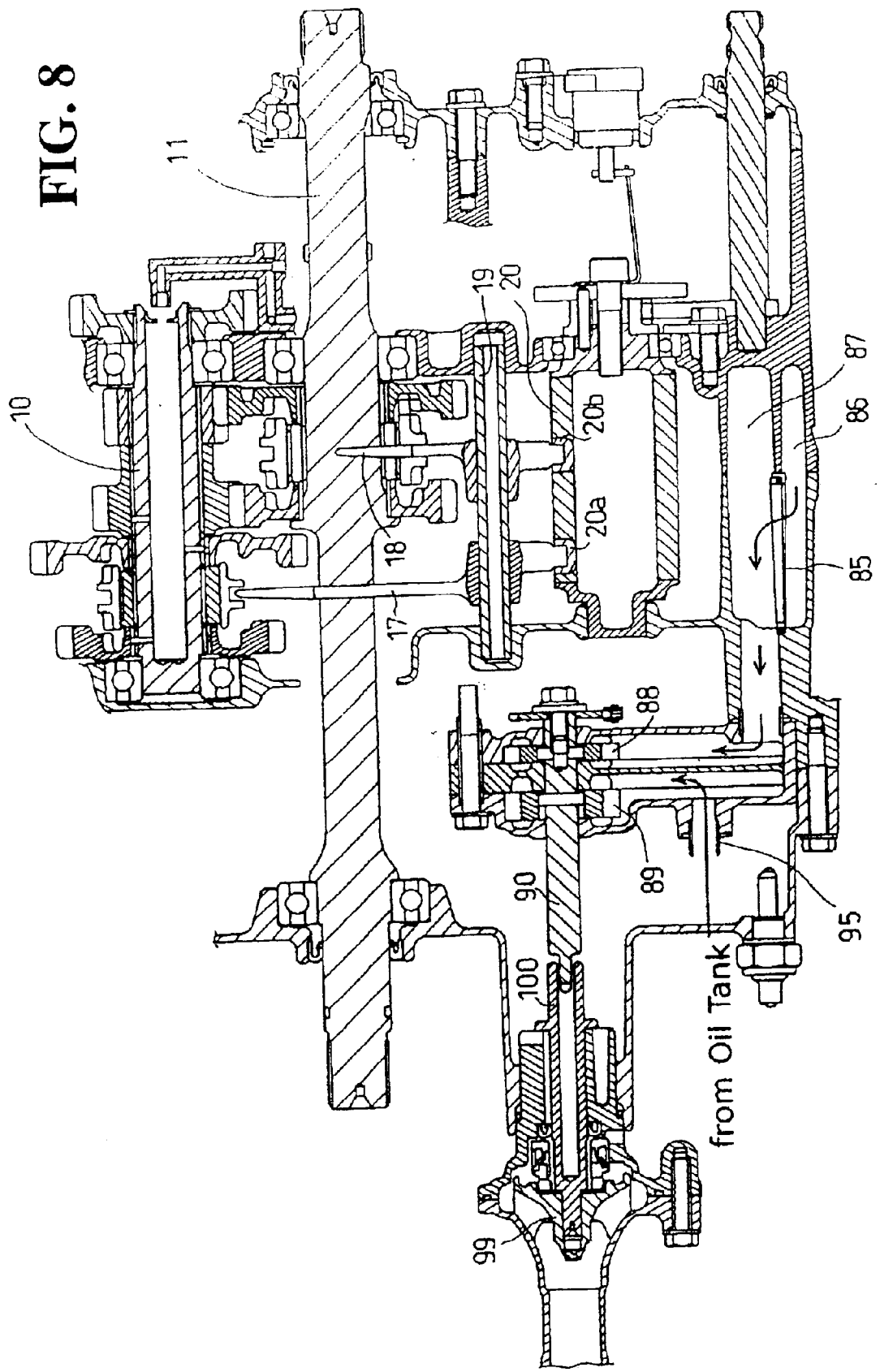
FIG. 8 is a longitudinal sectional view of the power unit, including the counter shaft, the output shaft, the shift fork guide shaft, the shift drum, and the strainer.

FIG. 8 is a longitudinal sectional view of the power unit 6, including the counter shaft 10, the output shaft 11, the shift fork guide shaft 19, the shift drum 20, and a strainer 85. In FIG. 8, the arrows indicate a direction of oil flow. An oil pump is provided on the front side of the strainer 85. The oil pump is a tandem oil pump composed of a rear oil pump 88 and a front oil pump 89 mounted on a common oil pump shaft 90. The rear oil pump 88 is in communication with an upper space 87 formed above the strainer 85. The strainer 85 and its periphery are shown in front elevation in FIG. 2.

FIG. 9 is a front elevation of the oil pump and its associated parts provided between the front crankcase cover 24 and the front crankcase 25. FIG. 10 is a front elevation of the oil filter 65 and its associated parts provided on the front side of the front crankcase cover 24. In FIG. 9, the arcuate arrow indicates a direction of rotation of the torque converter impeller 31. As shown in FIGS. 6 and 9, the oil pump shaft 90 is driven through a chain 93 wrapped between a sprocket 91 mounted on the crankshaft 7 and a sprocket 92 mounted on the oil pump shaft 90.

The oil dropped into the lower space 62a of the transmission chamber 62 shown in FIGS. 2 and 6 flows into a lower space 86 formed below the strainer 85 shown in FIGS. 2 and 8. The oil is then pumped up by the operation of the oil pump to pass through the strainer 85 into the upper space 87 formed above the strainer 85. The oil is further sucked by the rear oil pump 88 communicating with the upper space 87, and is discharged through a rear pump discharge pipe 94 shown in FIG. 6 to an oil tank (not shown). The oil in the oil tank is sucked through a suction pipe 95 shown in FIG. 8 by the front oil pump 89, and is discharged through a front pump discharge pipe 96 shown in FIG. 6 to the oil filter 65 shown in FIGS. 6 and 10. As shown in FIGS. 6 and 9, the front pump discharge pipe 96 is branched to form a branch pipe 97 connected to a pressure control valve 98 for maintaining the pressure of the oil supplied to the oil filter 65 at a given value.

A part of the oil fed to the oil filter 65 and purified therein is supplied to the double pipe inserted in the crankshaft 7, and serves as the hydraulic oil for the torque converter 30, the lubricating oil for the bearings on the outer circumference of the crankshaft 7, and the lubricating oil for the crankpin 7b. Another part of the oil from the oil filter 65 is fed through oil passages formed in the crankcase covers 24 and 27 and in the crankcases 25 and 26 to the bearings for the rotating shafts in the transmission chamber 62, serving as a lubricating oil. Still another part of the oil from the oil filter 65 is fed through the valve body 53 equipped with a linear solenoid valve 52A and a shift solenoid valve 52B to the first-speed hydraulic multiplate clutch 39 or the second-speed hydraulic multiplate clutch 40 for switching between the first speed and the second speed. The solenoid valves 52A and 52B are on/off controlled by the electronic control unit.

As shown in FIG. 6, a water pump 99 is connected to the front end of the oil pump shaft 90. The water pump 99 is mounted on a water pump shaft 100 coaxially rotating with the oil pump shaft 90. Water discharged from the water pump 99 is fed through a discharge port 101 to the area surrounding the cylinder for the purpose of cooling.

As described above, in the internal combustion engine with the torque converter according to this preferred embodiment, the return oil from the torque converter can be returned to an oil reservoir with a simple structure without a reduction in breather function due to the oil return into the air. Furthermore, the crank chamber can be closed and the amount of oil supplied into the crank chamber can be limited to a minimum amount required by the area surrounding the crankshaft, thereby reducing an influence of friction due to agitation. On the other hand, the oil supply passage dedicated to the torque converter is ensured to thereby allow a reduction in amount of oil to be supplied to the whole of the crank system. Accordingly, the crankcase can be reduced in volume to thereby reduce the weight of the power unit.

In addition, the pressure of the hydraulic oil to be supplied to the torque converter 30 can be maintained at a given value or more by the check valve 75 provided at the downstream end of the return oil passage 74 from the torque converter 30. Furthermore, the oil pressure in an upstream portion of the hydraulic system can be maintained at a given value or more by the operation of the pressure control valve 98 connected to the branch pipe 97 branched from the discharge pipe 96 of the front oil pump 89.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine, comprising:
   a torque converter, said torque converter being provided on a crankshaft having an axially extending center hole for supplying hydraulic oil to said torque converter;
   a return oil passage from said torque converter, said return oil passage being in communication with a hydraulic oil return passage formed in said crankshaft so as to extend axially of said crankshaft;
   a chamber in communication with said hydraulic oil return passage, said chamber being defined by a pair of inner and outer oil seals for sealing a bearing mounted on said crankshaft; and
   an oil passage in communication with said chamber, said oil passage being formed in a crankcase of the engine and having a check valve at a downstream end thereof.

2. An internal combustion engine comprising:
   a torque converter, said torque converter being provided on a crankshaft having an axially extending center hole for supplying hydraulic oil to said torque converter;
   a return oil passage from said torque converter, said return oil passage being in communication with a hydraulic oil return passage formed in said crankshaft so as to extend axially of said crankshaft;
   a chamber, said chamber being defined by a pair of inner and outer oil seals for sealing a bearing mounted on said crankshaft; and
   an oil passage, said oil passage being in communication with a crankcase and having a check valve at a downstream end thereof,
   wherein a pipe is inserted in said center hole of said crankshaft to form a hydraulic oil passage leading to said torque converter, said hydraulic oil return passage from said torque converter, and a lubricating oil passage leading to an area surrounding said crankshaft.

3. The internal combustion engine according to claim 1, wherein a crank chamber and a transmission chamber are separated from each other through a one-way valve.

4. The internal combustion engine according to claim 2, wherein a crank chamber and a transmission chamber are separated from each other through a one-way valve.

5. The internal combustion engine according to claim 1, wherein said axially extending center hole in said crankshaft includes an inner pipe and an outer pipe inserter therein, a space between said inner pipe and said outer pipe forming a hydraulic oil supply passage in communication with a radial hydraulic oil supply passage to said torque converter, and an interior of said inner pipe forming an oil passage in communication with an oil supply passage to a crank pin of the engine.

6. The internal combustion engine according to claim 5, wherein a space formed between said outer pipe and said center hole of said crankshaft forms said hydraulic oil return passage formed in said crankshaft.

7. The internal combustion engine according to claim 6, wherein a portion of said hydraulic oil supply passage is formed between said outer pipe and said center hole of said crankshaft, and said hydraulic oil return passage is separated from said hydraulic oil supply passage by a seal between said inner pipe and said center hole of said crankshaft.

8. The internal combustion engine according to claim 5, wherein said hydraulic oil supply passage to said torque converter and said oil supply passage to said crank pin are in communication with an oil supply passage from an oil filter of the engine.

9. An internal combustion engine, comprising:
   a crankshaft, said crankshaft having an axially extending center hole formed therein;
   an inner pipe and an outer pipe inserted into said axially extending center hole; and
   a torque converter, said torque converter being provided on said crankshaft;
   wherein a space between said inner pipe and said outer pipe forms a hydraulic oil supply passage to said torque converter.

10. The internal combustion engine according to claim 9, wherein an interior of said inner pipe forms an oil supply passage to a crank pin of the engine.

11. The internal combustion engine according to claim 9, wherein a crank chamber and a transmission chamber are seaparated from each other through a one-way valve.

12. The internal combustion engine according to claim 9, wherein a space formed between said outer pipe and said center hole of said crankshaft forms a hydraulic oil return passage from said torque converter.

13. The internal combustion engine according to claim 12, wherein a portion of said hydraulic oil supply passage is formed between said outer pipe and said center hole of said crankshaft, and said hydraulic oil return passage is separated from said hydraulic oil supply passage by a seal between said inner piep and said center hole of said crankshaft.

14. The internal combustion engine according to claim 9, further comprising:
   a chamber, said chamber being defined by a pair of inner and outer oil seals for sealing a bearing mounted on said crankshaft; and
   an oil passage, said oil passage being in communication with a crankcase and having a check valve at a downstream end thereof.

15. The internal combustion engine according to claim 10, wherein said hydraulic oil supply passage to said torque converter and said oil supply passage to said crank pin are in communication with an oil supply passage from an oil filter of the engine.

16. The internal combustion engine according to claim 1, wherein said pair of inner and outer oil seals are located between an outer surface of said crankshaft and an inner surface of said crankcase to form said chamber between said crankshaft and said crankcase.

17. The internal combustion engine according to claim 14, wherein said pair of inner and outer oil seals are located between an outer surface of said crankshaft and an inner surface of said crankcase to form said chamber between said crankshaft and said crankcase.

* * * * *